No. 822,859. PATENTED JUNE 5, 1906.
G. W. HUBER.
COMBINED ALCOHOL LAMP AND BOILER.
APPLICATION FILED MAR. 7, 1905. RENEWED MAY 14, 1906.

UNITED STATES PATENT OFFICE.

GEORGE W. HUBER, OF PHILADELPHIA, PENNSYLVANIA.

COMBINED ALCOHOL LAMP AND BOILER.

No. 822,859.          Specification of Letters Patent.          Patented June 5, 1906.

Application filed March 7, 1905. Renewed May 14, 1906. Serial No. 316,634.

*To all whom it may concern:*

Be it known that I, GEORGE W. HUBER, a citizen of the United States, residing at Philadelphia, in the county of Philadelphia and State of Pennsylvania, have invented a new and useful Combined Alcohol Lamp and Boiler, of which the following is a specification.

This invention relates to self-contained portable heating or cooking utensils in which it is desirable to rapidly bring the contents thereof to a high temperature without recourse to means outside of its own construction. Its objects are to provide an efficient device for the above purposes designed and constructed on scientific principles; to provide in such a device means whereby the fuel or heating medium, preferably alcohol, is readily introduced to the combustion-chamber in which it is consumed in a gaseous condition; to provide in such a device means whereby the fuel may be easily ignited and as readily extinguished, when desirable, without the usual difficulty; to further provide a device in which the base is comparatively cool when in use and which may safely be used by inexperienced operators. These and minor other objects are attained in the device hereinafter fully described, and shown in the accompanying drawings, in which—

Figure 2:
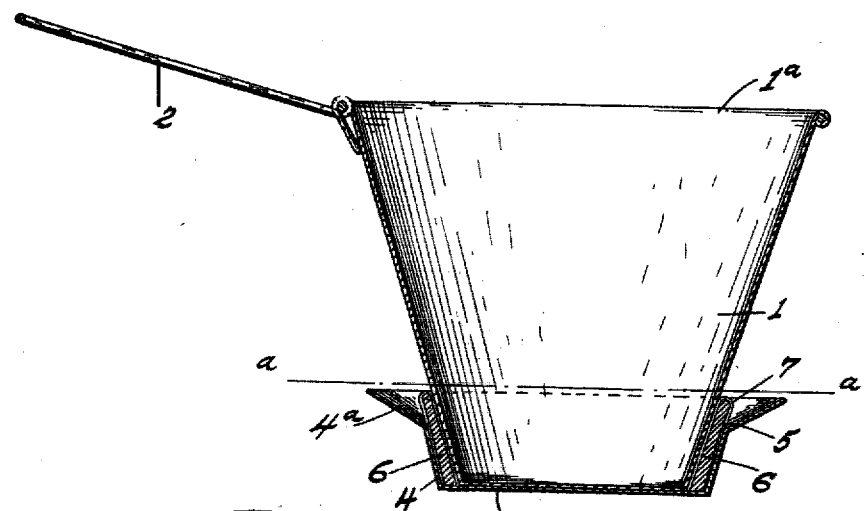
Figure 3:
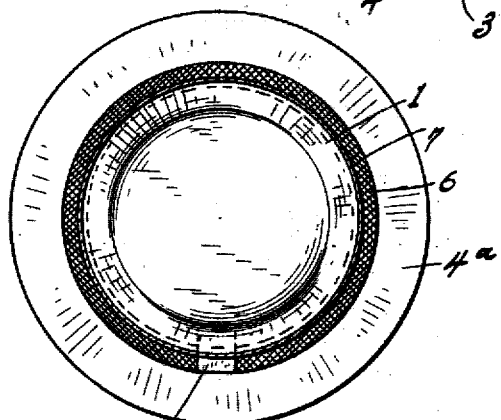
Figure 1:
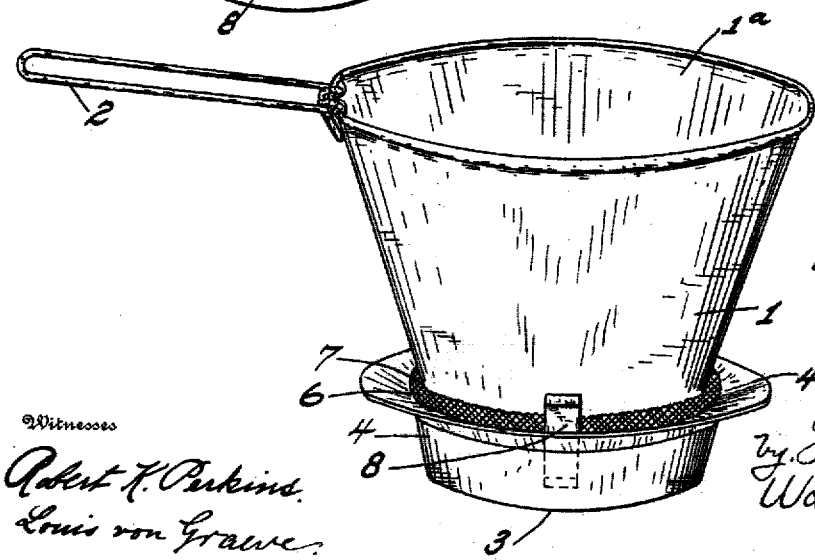

Figure 1 is a perspective view of the entire utensil. Fig. 2 is a section on the center line thereof, and Fig. 3 is a section on line *a a* of Fig. 2.

Similar characters refer to similar parts throughout the several views.

In the drawings the vessel 1, which may be constructed of any required size from suitable thin metal, as copper or tin, is made conical or funnel-shaped, the larger open end being at the top 1ª and wired, as is common with vessels of the kind. To this wiring is attached the hinged handle 2 in such manner as to afford a secure grip in raising or conveying the utensil, but which is capable of being folded over the top of the vessel when desired, thus occupying less space. The bottom 3 of the vessel is so united to the body as to be secure from leakage and not affected by heat. The angle of the body is such as to secure the best results from the surrounding flame and also permit of readily filling the combustion-chamber from a bottle or can.

The walls of the cup-shaped fuel-reservoir 4 are upturned from the base 3 parallel to and surrounding the lower part of the vessel, forming an open-topped annular channel or recess 5 between the exterior of the walls of the vessel 1 and the interior of the reservoir 4. The said walls are outwardly flanged around their entire circumference, as at 4ª, this flange having a slight angle forming a concave face extending to the edge for the purpose of deflecting the flame against the sides of the vessel and also to retain the liquid fuel, directing it to the recess 5. The space within the recess is filled with loose fibers of asbestos 6, which become saturated with the liquid fuel, serving as a wick in keeping the main contents of the reservoir cool, while at the same time by capillary attraction feed the fuel in condition for ignition and combustion. The asbestos further prevents the expansion and ebullition of the liquid fuel, its loss, and any danger consequent thereto. Surrounding the asbestos at the top and confining it within the recess is the gauze or wire-netting 7, preventing displacement or injury thereto.

It will be noticed that the angle of the flange 4ª is such as to allow air to freely reach the flame, without which it would not burn, and that no interior air-vents are used; also, that the reservoir 5 is so proportioned as to hold only sufficient fuel to properly heat the contents of the vessel, thus avoiding waste. Should it be desirable, however, to extinguish the flame before the contents of the reservoir have become exhausted, I provide a stop-plate 8 at a point within the annular recess or reservoir 5, extending from the bottom up to a distance above the point of ignition and completely closing the passage in the said channel, which provision is necessary to readily accomplish the extinguishment of the flame. Without the plate air blown upon the flame acts only to divert it to the opposite side of the vessel, from whence it returns when the blast is stopped; but by reason of the said plate the flame is prevented from passing around in the recess and may be readily extinguished.

From the construction it is clear that the reservoir will contain no free surplus fluid fuel, thence cannot spill should the vessel be overturned. It is also evident that the flame is sufficiently above the base not to cause excessive heat therein and also that the colder portion of the contents of the vessel will be at the bottom, further serving to keep it cool.

Having thus described my invention, what

I claim, and desire to secure by Letters Patent, is—

1. In a device of the class described, the combination with an open-topped vessel, a handle therefor and a combustion-chamber attached thereto, of asbestos wicking within the said combustion-chamber, a protective covering for the wicking, a concave annular flange around the said chamber and a plate within the said chamber adapted to break the continuity of the passage therein, all substantially as shown and described.

2. In a culinary utensil or the like, the combination with a conical vessel adapted to contain fluids, of an annular flanged chamber surrounding the base thereof and forming a support thereto, an absorbent non-destructible material interposed between the walls of the said vessel and the interior of the flanged chamber, a metallic gauze covering the said material and a separator cutting off the continuity of the annular recess between the walls of the said vessel and the flanged chamber, all substantially as shown and described.

In testimony whereof I have signed my name to this specification in the presence of two subscribing witnesses.

GEORGE W. HUBER.

Witnesses:
 LOUIS VON GRAEVE,
 ROBERT K. PERKINS